United States Patent
Armstrong et al.

(10) Patent No.: US 6,643,988 B1
(45) Date of Patent: Nov. 11, 2003

(54) FRAME ASSEMBLY WITH A FLUSH CORNER APPEARANCE

(75) Inventors: Laurence P. Armstrong, Weyerhaeuser, WI (US); Steve K. Laumann, Cameron, WI (US)

(73) Assignee: AMSCO Engineered Products, Rice Lake, WI (US)

( * ) Notice: Subject to any disclaimer, the term of this patent is extended or adjusted under 35 U.S.C. 154(b) by 0 days.

(21) Appl. No.: 10/145,057

(22) Filed: May 14, 2002

(51) Int. Cl.[7] ................................................. E04C 2/38
(52) U.S. Cl. .................... 52/656.2; 52/656.6; 52/204.1; 403/231; 403/403
(58) Field of Search ............................ 52/656.4, 656.2, 52/656.6, 656.7, 745.15, 204.1, 656.9, 656.5; 49/504; 403/231, 401, 403, 387

(56) References Cited

U.S. PATENT DOCUMENTS

| | | |
|---|---|---|
| 2,601,164 A | 6/1952 | Montgomery |
| 3,571,996 A | 3/1971 | Braswell |
| 3,769,773 A | 11/1973 | Mochizuki |
| 4,843,775 A | 7/1989 | Armstrong et al. |
| 5,581,953 A | 12/1996 | Ruff |
| 6,070,375 A | 6/2000 | Anderson et al. |
| 6,311,454 B1 | 11/2001 | Kempel |

Primary Examiner—Carl D. Friedman
Assistant Examiner—Nahid Amiri
(74) Attorney, Agent, or Firm—Howard & Howard

(57) ABSTRACT

A frame assembly for creating a flush corner appearance is disclosed. The frame assembly includes first and a second members. The first member has a plurality of sides that extend between a first and second end such that one side defines an opening extending thereinto from the first end. The opening defines a pair of lateral flanges for engaging the second member. The second member includes a plurality of sides that extend between a first and second end. The second member also includes a first connector extending from a first side and a second connector extending from a second side. A first tab extends from the first connector and is moveable between a straight position and a bent position such that the first tab guides the first member into engagement with the second member when the first tab is in the bent position. A second tab extends from the second connector and is flush with the first end of the first member when the members are connected.

35 Claims, 7 Drawing Sheets

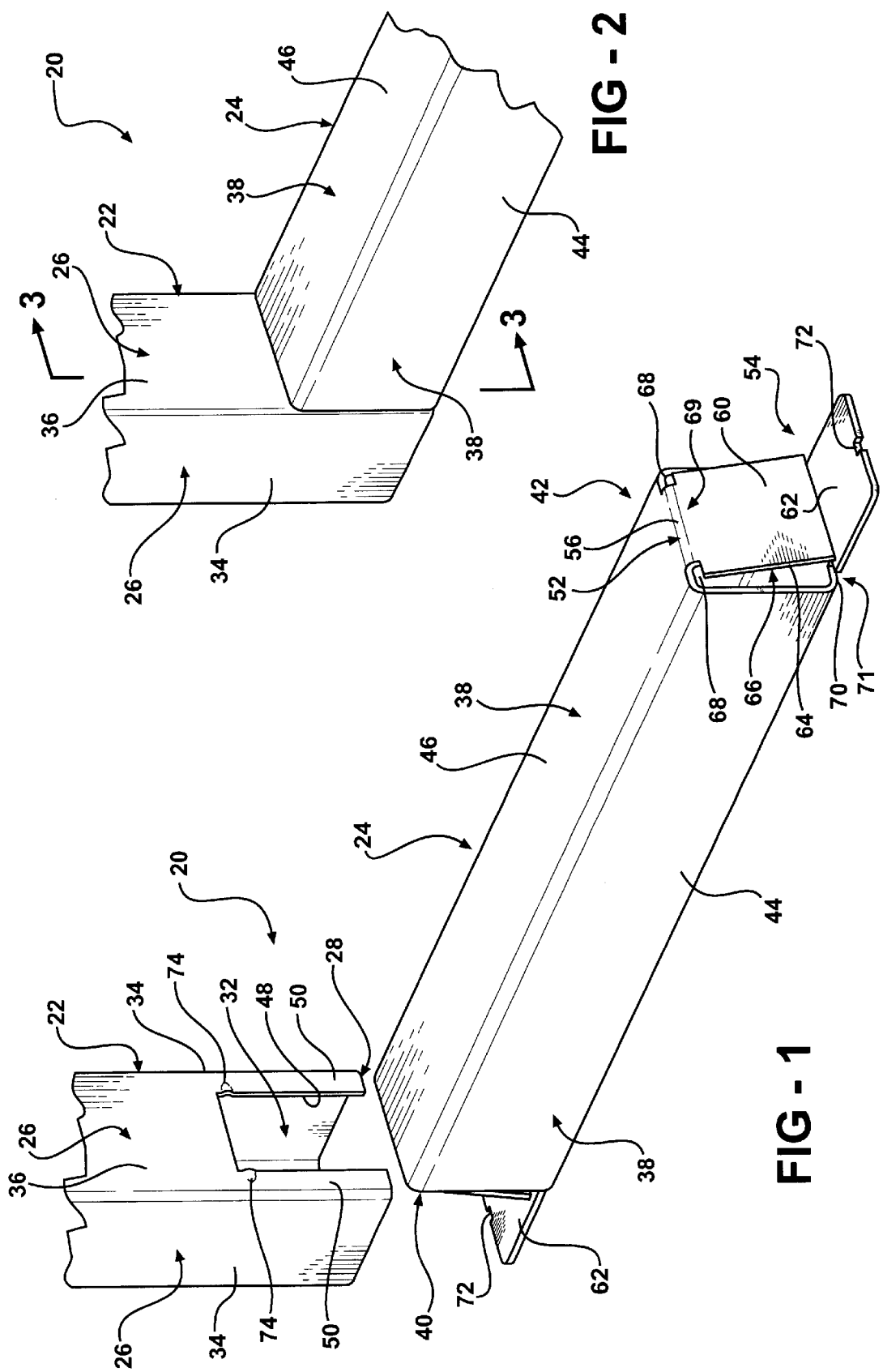

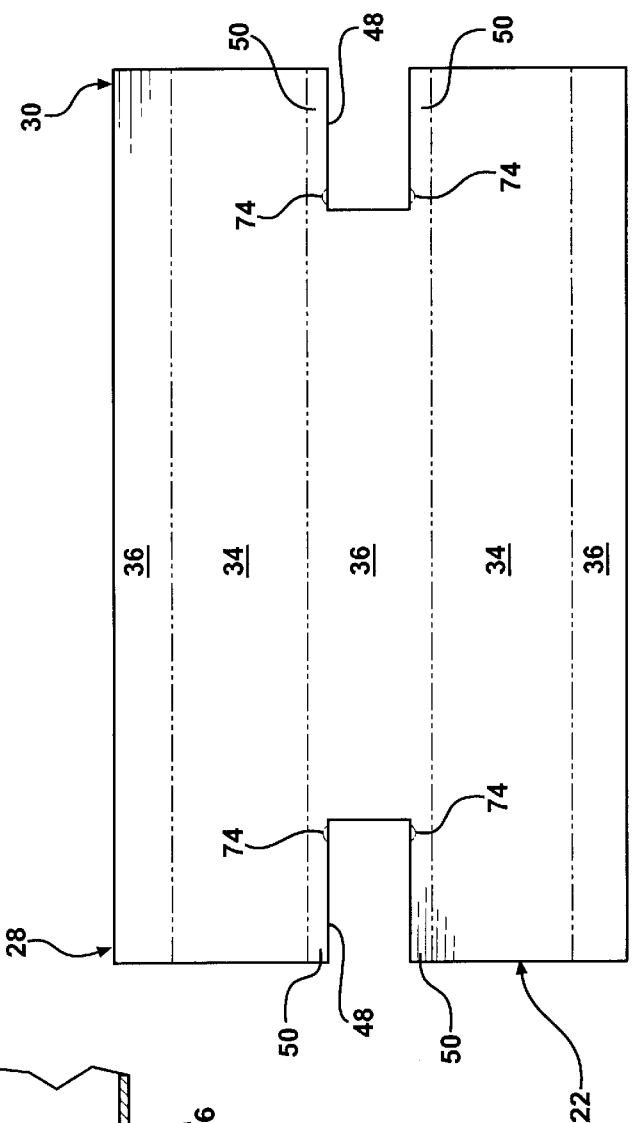
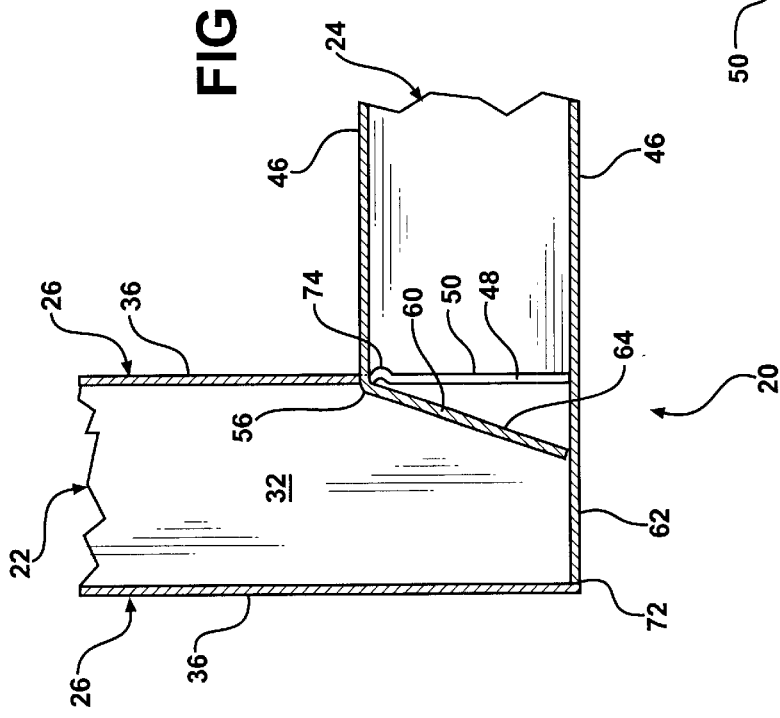

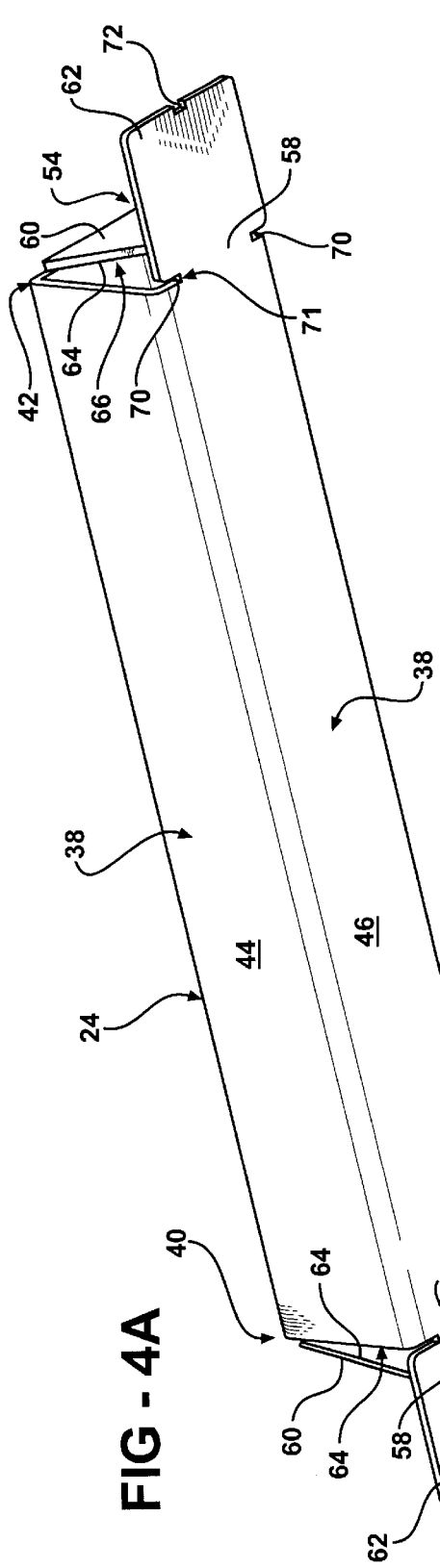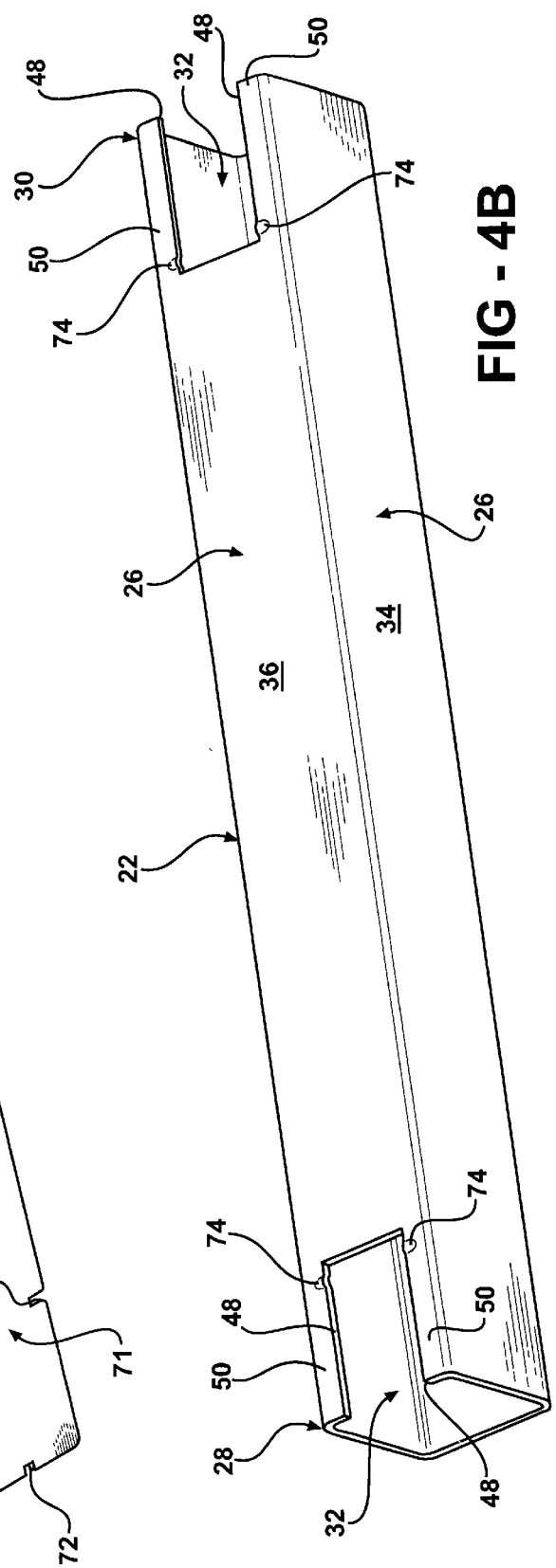

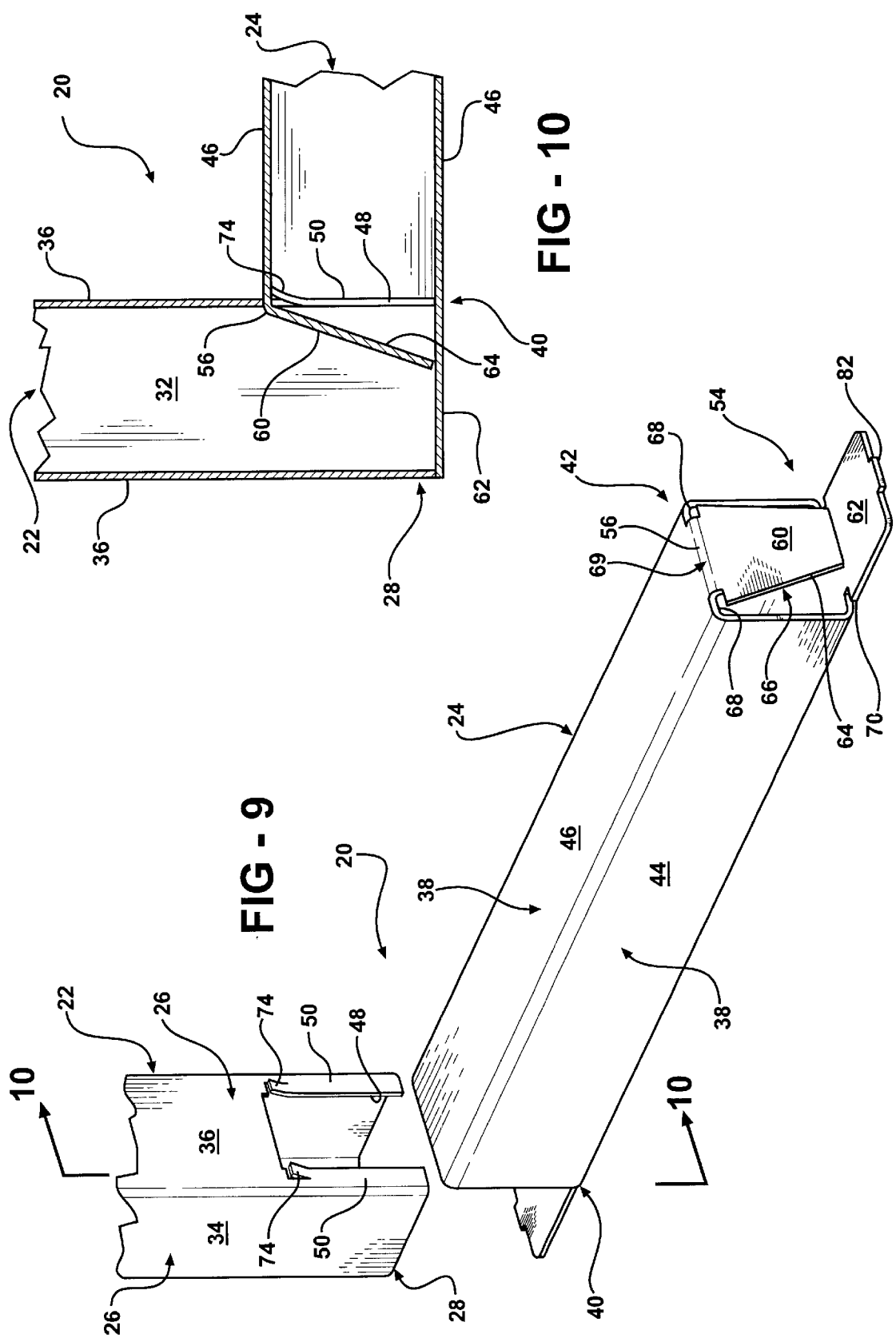

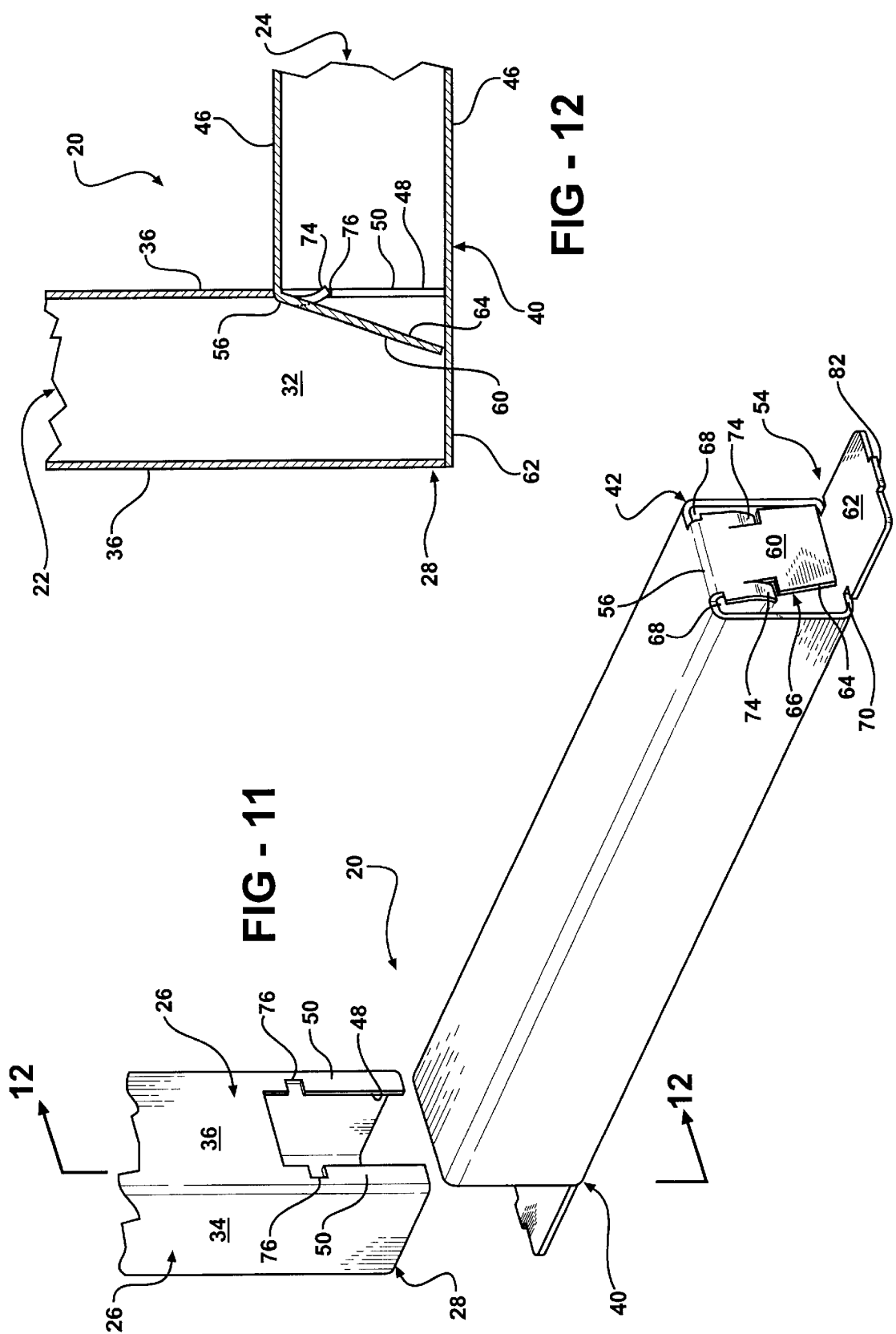

FRAME ASSEMBLY WITH A FLUSH CORNER APPEARANCE

BACKGROUND OF THE INVENTION

1. Field of the Invention

The subject invention provides a frame assembly for creating a flush corner appearance.

2. Description of the Related Art

Frame assemblies for creating a frame that is easily formed are known in the art. These conventional frame assemblies include frame members having interlocking features to secure the individual frame members to one another. Illustrative examples of these frame assemblies are shown in U.S. Pat. Nos. 6,311,454; 6,070,375; and 3,571,996. Another example is U.S. Pat. No. 4,843,775 which discloses a frame assembly including a first member and a second member. The first member includes a plurality of sides that define a pair of flanges. The second member includes a plurality of sides. The sides of the second members have slots for receiving the flanges. A locking mechanism extends from the first member for securing the members to one another. However, the '775 patent does not form a flush corner assembly between the sides or the ends of the members when connected because the first frame member receives the second member within the first member. This results in a lip between the two members because the first member is wider than the second member. Also, the second member does not close the bottom of the first member and therefore is not flush.

A further example is U.S. Pat. No. 5,581,953 which discloses a frame assembly including a first member with a plurality of sides and a second member with a plurality of sides. Bendable tabs extend from the sides of the first member, and the sides of the second member include slots for receiving the bendable tabs. Once the bendable tabs of the first member are inserted into the slots of the second member, the tabs are bent over the slots to secure the frame members to one another. However, the '953 patent does not form a closed flush corner between the sides and ends of the members when they are connected because the frame members have an open side to mounted in a wall and the second member is not received by the first member to close the end of the first member.

A yet another example of a conventional frame is disclosed in U.S. Pat. No. 3,769,773. The '773 patent discloses a frame assembly including a first member and a second member. The first member includes a tab that is bent to form a channel and the second member has an opening to be received in the channel. The opening being received in the channel locks the two members together. However, the second member is not received within the first member to close then end of the first member.

Accordingly, the conventional assemblies are characterized by one or more inadequacy. Specifically, the conventional assemblies do not provide a frame assembly that creates a flush corner appearance between the sides and ends of the member when connected. Because the corners are not flush, the assemblies also have poor sealing and bonding qualities between the members. Also, the related art assemblies require additional welding and bonding of the corners to prevent the frame members from disconnecting. Additional welding and bonding is time consuming and non-aesthetic.

BRIEF SUMMARY OF THE INVENTION AND ADVANTAGES

The subject invention provides a frame assembly for creating a flush corner appearance. The assembly includes a first member having at least one appearance side and at least one connecting side. The appearance side and the connecting side extend between a first end and a second end and define a first hollow area therebetween. The assembly also includes a second member having at least one appearance side and at least one connecting side. The appearance side and the connecting extend between a first end and a second end. The connecting side of the first member defines an opening extending thereinto from the first end to define a pair of lateral flanges. A first connector extends from the first end of the second member, and a first tab is connected to the first connector. The first tab defines a first slot for disposing the members transversely to one another with the first end of the first member disposed over the first end of the second member. With the members disposed transversely to one another, the flanges extending through the slot. The first tab also has a cross-sectional area less than the first hollow area such that the first hollow area receives the first tab. The first tab is bendable about the first connector between a straight position and a bent position to guide the first member into engagement with the second member while in the bent position.

The subject invention overcomes the inadequacies that characterize the frame assemblies of the prior art. Specifically, the subject invention provides the frame members having the flush corner appearance between the sides and ends of the individual members when connected. The flush corners allow the members to have improved sealing and bonding qualities between the members. Also, the flush corner appearance of the subject invention creates an aesthetic corner between the members because the members do not require any additional welding or banding of the corners to prevent them from disconnecting.

BRIEF DESCRIPTION OF THE DRAWINGS

Other advantages of the present invention will be readily appreciated as the same becomes better understood by reference to the following detailed description when considered in connection with the accompanying drawings wherein:

FIG. 1 is a perspective view of a frame assembly having a first member and a second member;

FIG. 2 is a perspective view the frame assembly that is assembled to create a flush corner appearance;

FIG. 3 is a cross-sectional view through the center of the frame assembly along line 3—3 of FIG. 2

FIG. 4A is a perspective top view of the second member;

FIG. 4B is a perspective top view of the first member;

FIG. 6 is a perspective view of a material blank for the first member prior to roll forming;

FIG. 9 is a perspective view of an alternative embodiment of the frame assembly illustrating an alternate detent for securing the first member to the second member;

FIG. 10 is a cross-sectional view through the center along line 10—10 of FIG. 9 illustrating the first member engaging the second member with the alternate detent;

FIG. 11 is a perspective view of yet another embodiment of the frame assembly illustrating another detent for securing the first member to the second member; and FIG. 12 is a cross-sectional view through the center along line 12—12 of FIG. 11 illustrating the first member engaging the second member with the detent.

DETAILED DESCRIPTION OF THE INVENTION

Figure 5:
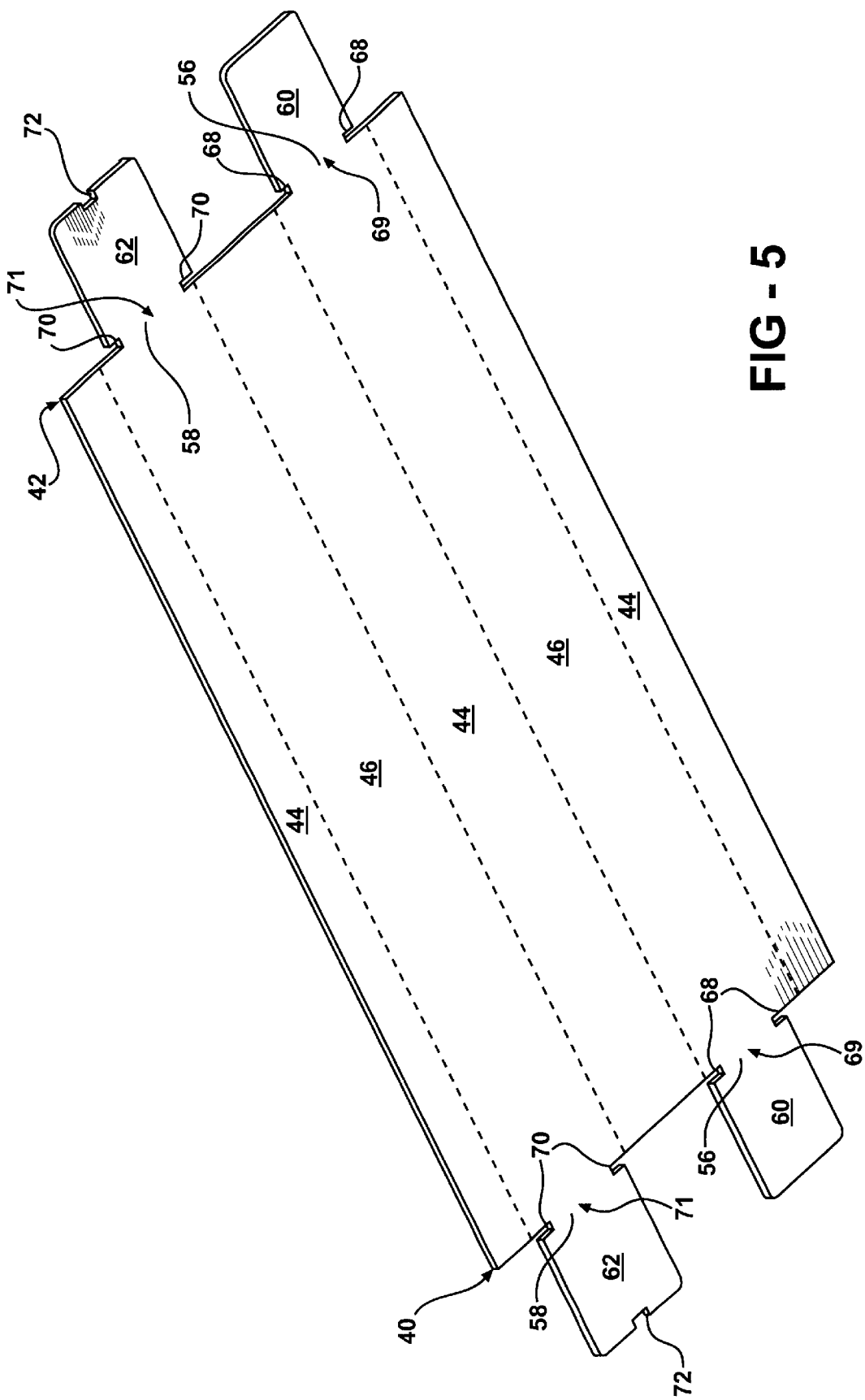
FIG. 5 is a perspective view of a material blank for the second member prior to roll forming.

Referring to the Figures, wherein like numerals indicate like or corresponding parts throughout the several views, a frame assembly for creating a flush corner appearance is generally shown at 20. The frame assembly 20 includes a first member 22 and a second member 24. The first member 22 and the second member 24 are preferably formed from a metal, but may also be formed of other materials, such as a plastic. The preferred types of metals include aluminum and steel. It is to be appreciated that one skilled in the art may utilize different metals to form the first member 22 and the second member 24 while still accomplishing the subject invention. The frame assembly 20 of the subject invention is particularly useful for doorframes, window frames and office wall partitions, but may also be utilized for picture frames and the like. In such uses, there are two first members 22, 24 and two second members. The two first members 22, 24 may be the vertical members 22, 24 and the two second members 22, 24 may be the horizontal members, or vice versa.

With reference to FIG. 1, the first member 22 includes a plurality of sides 26. The plurality of sides 26 extend between a first end 28 and a second end 30 and define a first hollow area 32 therebetween. The first hollow area 32 is defined between the plurality of sides 26 and is preferably at each of the first end 28 and the second end 30. It is to be understood that the first member 22 may be a solid member with the first hollow area 32 extending from the solid member. The plurality of sides 26 includes at least one appearance side 34 and at least one connecting side 36. The appearance side 34 and the connecting side 36 are described below.

The second member 24 includes a plurality of sides 38 that extend between a first end 40 and a second end 42. The second member 24 is preferably hollow, but may be a solid member. The plurality of sides 38 includes at least one appearance side 44 and at least one connecting side 46. Preferably, the first member 22 has the same configuration on each of its ends 28, 30 and the second member 24 has the same configuration on of each of its ends 40, 42. The first member 22 and the second member 24 have different end configurations as will be described below. For ease of description, only the interaction between the first ends 28, 40 of the members 22, 24 is described, but the other ends may have the same interaction. Alternately, the ends 28, 30 of the first member 22 and the ends 40, 42 of the second member 24 may not have the same configuration, for example if the frame assembly 20 only has the first member 22 and the second member 24 or the second ends 30, 42 may be unnecessary.

The appearance sides 34, 44 of each of the members 22, 24 are further defined as a front and back face of the respective members 22, 24, and the connecting sides 36, 46 of each of the members 22, 24 are defined as a top and bottom face of the respective members. The connecting sides 36, 46 interconnect the first member 22 to the second member 24. It is to be understood that an appearance side may also be used to interconnect the members, but preferably the connecting sides 36, 46 interconnect the members 22, 24 to one another, as will be described further below.

The first member 22 and the second member 24 are disclosed as having a pair of parallel connecting sides 36, 46 and a pair of appearance sides 34, 44, respectively. In other words, in a cross-sectional view of the first member 22 and the second member 24, each has four sides. However, the frame assembly 20 may have greater or fewer sides depending upon the desired shape of the frame assembly 20. For example, a triangular-shaped frame would have three sides and a pentagonal-shaped frame would have five sides. Independent of the shape of the frame assembly 20, the first member 22 and the second member 24 may have equal cross-sections such that when the members 22, 24 are connected, the sides are flush, i.e., coplanar. As shown in the Figures, the first member 22 and the second member 24 are tubular and include the appearance side 34, 44 interconnecting the connecting side 36, 46. Therefore, when connected, the appearance side 34 of the first member 22 is flush with the appearance side 44 of the second member, as shown in FIG. 2.

Referring to FIGS. 1, 4B, and 6, the first member 22 has one connecting side 36 that defines an opening 48 extending thereinto from the first end 28. In other words, the opening 48 extends longitudinally from the first end 28 toward the second end 30. The opening 48 is generally U-shaped. The opening 48 defines a pair of lateral flanges 50 for engaging the second member 24. The lateral flanges 50 preferably extend toward one another inward from the appearance side 34. However, the lateral flanges 50 may be formed such that they extend away from one another and outward from the connecting side 36 depending upon the shape of the opening 48 and the shape of the second member.

The second member 24 includes a connector 52 extending from the first end 40. A tab 54 extends from the connector 52 for being received into the first hollow area 32. The tab 54 closes the first hollow area 32 when the first member 22 and the second member 24 are disposed transversely to one another at the first ends 28, 40. The tab 54 creates the flush corner appearance between the tab 54 and the first member 22 when connected. The tab 54 fits snugly into the first hollow area 32 of the first end 28 of the first member 22 for closing the first end 28 of the first member 22. By being disposed transversely, the first member 22 and the second member 24 are arranged such that the first ends 28, 40 are connected together. The lateral flanges 50 of the first member 22 slides into the second member 24 such that the first member 22 and the second member 24 are perpendicular when engaged. After connecting, the tab 54 is flush with the first end 28 of the first member 22 and the appearance side 34 of the first member 22 is coplanar with the appearance side 44 of the second member.

The connector 52 is further defined as a first connector 56 extending from a first side of the second member 24 and a second connector 58 extending from a second side of the second member 24. In the preferred embodiment, the first side is opposite the second side and the first side and the second side are the connecting sides 36, 46 of the second member 24. The first connector 56 and second connector 58 are centrally located on the respective sides.

The tab 54 is further defined as a first tab 60 extending from the first connector 56 and a second tab 62 extending from the second connector 58. The first tab 60 includes an inner face 64 and is moveable about the first connector 56 between a straight position and a bent position. The bent position is shown in FIG. 1 and it is to be appreciated that if the first tab 60 is bent upwardly, then the straight position results. A channel 66 is established between the inner face 64 and the first end 40 of the second member 24 when the first tab 60 is in the bent position. The inner face 64 guides the first member 22 into engagement with the second member 24 when the first tab 60 is in the bent position. As the first member 22 and the second member 24 are connected, the lateral flange 50 is received within the channel 66 to guide the first member 22 into engagement with the second member 24.

Figure 7:
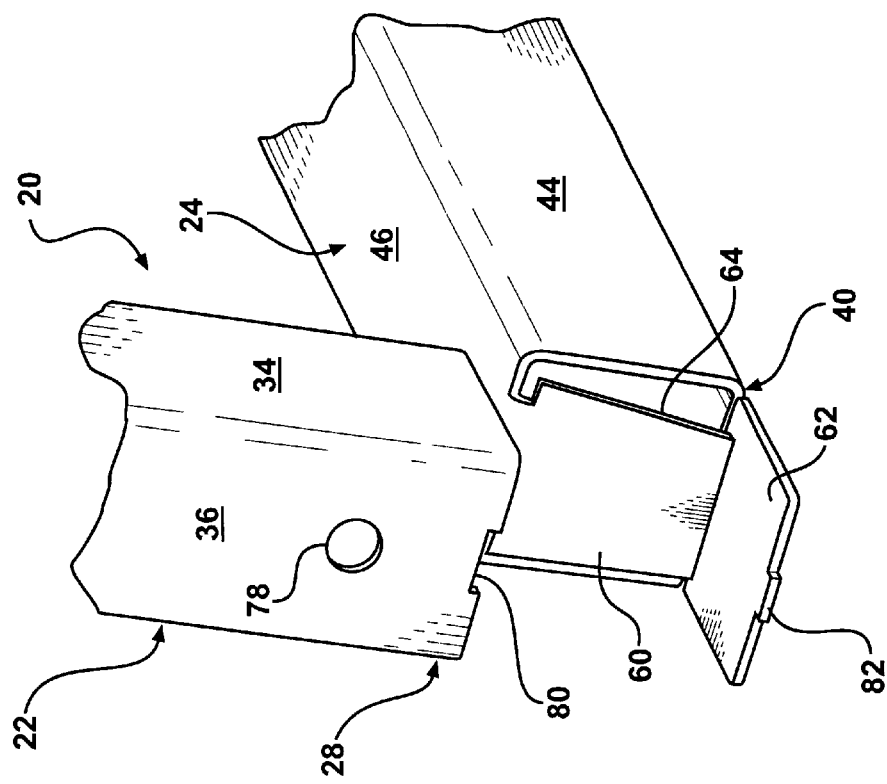
FIG. 7 is a perspective view illustrating a hole and a notch in the first member, and a projection in the second frame member that engages the notch.

Referring to FIG. 3, the first tab 60 is connected to the first connector 56 and defines a first slot 68. The first slot 68 is defined between the first tab 60 and the first end 40 of the second member 24. The first slot 68 for allows the members 22, 24 to be disposed transversely to one another with the first end 28 of the first member 22 disposed over the first end 40 of the second member 24. The lateral flanges 50 extend through the first slot 68 when the members 22, 24 are so disposed. The first slot 68 is an entrance to the channel 66 when the first tab 60 is in the bent position. The first tab 60 has a cross-sectional area that is less than the first hollow area 32 such that the first hollow area 32 receives the first tab 60 within the first hollow area 32. The first tab 60 may be bent prior to connecting the first member 22 to the second member 24 or bent after the members 22, 24 are connected. In such a manner, the first tab 60 is independently moveable from the second tab 62. The first tab 60 is tapered outwardly from the first connector 56, and preferably tapers from about 1 degree to about 20 degrees away from said first connector 56, as shown in FIG. 7.

Referring to FIGS. 4A and 5, the preferred embodiment includes the second tab 62 connected to the second connector 58. The second tab 62 defines a second slot 70 between the second tab 62 and the first end 40 of the second member 24 for receiving the lateral flanges 50. The lateral flanges 50 are received into the second slot 70 when the channel 66 slideably receives the first member 22. The second tab 62 extends in a straight position from the second connector 58. The second tab 62 fits snugly into the first hollow area 32 of the first end 28 of the first member 22 for closing the first end 28 of the first member 22. The second tab 62 has a cross-section equal to or slightly less than the first hollow area 32 such that when connected, the second tab 62 fits snugly therein. The second tab 62 may also include a recess 72 for engaging the first member 22. When the members 22, 24 are connected and the second tab 62 is within the first end 28 of the first member 22, one of the connecting sides 36 of the first member 22 may be forced into the recess 72. The connecting side 36 is forced by punching the material of the first member 22 into the recess 72 thereby securing the members 22, 24 together.

The first slot 68 is further defined as a pair of first slots 68 such that the first connector 56 separates each of the first slots 68. As best shown in FIGS. 1 and 5, the pair of first slots 68 is between the first tab 60 and the first end 40 of the second member 24. The pair of first slot 68 has a width less than a distance between the lateral flanges 50. The second slot 70 is also further defined as a pair of second slots 70 such that each of said the second connector 58 separates second slots 70. The pair of second slots 70 has a width less than a distance between the lateral flanges 50, as best shown in FIG. 4A, for receiving the first end 28 of the first member 22. The pair of first slots 68 and the pair of second slots 70 are wide enough to receive the connecting side 36 of the first member 22.

The subject invention includes a detent 74 adjacent the lateral flanges 50 for retaining the first and second members 22, 24 engaged with one another. The pair of first slots 68 is wider than the connecting side 36 of the first member 22, such that the detent 74 is able to slide through the pair of first slots 68. Additionally, the first tab 60 being in the bent position allows the first member 22 to be maneuvered such that the detent 74 is able to pass through the pair of first slots 68. In the preferred embodiment, shown in FIG. 3, the detent 74 is shown as a dimple of extra material extending from the lateral flange 50. The detent 74 is preferably the same material as the first member 22, but may be a different material. The detent 74 engages the second member 24 for retaining the first member 22 and the second member 24 engaged with one another. In one embodiment, the detent 74 preferably extends outwardly from the first hollow area 32, as shown in FIGS. 1 and 3. The outwardly extending detent 74, after the first member 22 has been slideably received by the second member 24, engages the connecting side 46 of the second member. The first tab 60 guides the first member 22 into engagement and forces the detent 74 within the second member 24.

Figure 8:
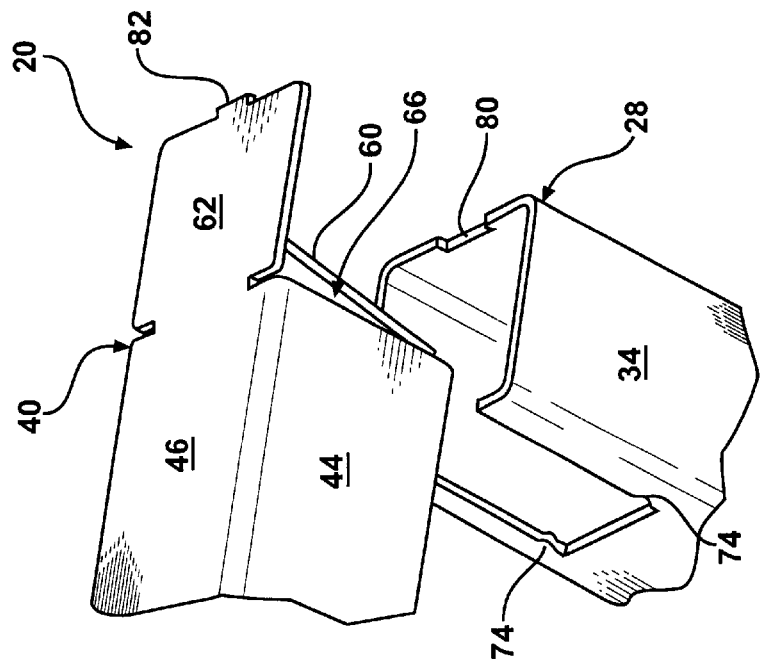
FIG. 8 is an alternative perspective view of the frame assembly illustrated in FIG. 7.

In another embodiment, shown in FIG. 8, the detent 74 extends inwardly from the lateral flange 50 and into the first hollow area 32. The detent 74 engages the first tab 60 for retaining the first member 22 and the second member 24 engaged with one another. The first tab 60, if bent, guides the first member 22 into engagement with the second member 24 and forces the detent 74 into contact with the first tab 60. If the first tab 60 is in the straight position, the pair of first slots 68 guide the first member 22 and once connected, the first tab 60 is bent to contact the inner face 64 with the detent 74 thereby securing them together.

As described above, the detent 74 is the dimple, but the detent 74 may also be an extension as shown in FIGS. 9 and 10. In FIG. 9, the extension extends outwardly from the lateral flange 50 and engages the second member 24. In this embodiment, the second member 24 has a second hollow area 71 defined between the plurality of sides 38 and the detent 74 engages the second hollow area 71. As shown in FIG. 10, as the first tab 60 guides the first member 22, the first tab 60 forces the detent 74 to engage the second hollow area 71. The extension may also extend inwardly from the opening 48 and engage the inner face 64 of the first tab 60, when the first tab 60 is in the bent position.

In yet another embodiment, shown in FIGS. 11 and 12, the lateral flange 50 defines an aperture 76 for receiving the detent 74 and for locking the first member 22 to the second member 24. The detent 74 extends from the first tab 60 for engaging the lateral flange 50 for retaining the first member 22 and the second member 24 engaged with one another. Referring to FIG. 12, the first member 22 slideably engages the pair of first slots 68 and the detent 74 engages the aperture 76 when the first tab 60 is in the bent position. To unlock the members, the first tab 60 is bent from the bent position until the detent 74 disengages the aperture 76.

Referring back to FIGS. 7 and 8, the first member 22 has a hole 78 disposed in either one of the appearance side 34 and the connecting side 36 for disengaging the detent 74 and unlocking the members. Preferably, the hole 78 is opposite to the first connector 56 such that, after the first member 22 and the second member 24 are connected, the first tab 60 may be manipulated to release the first member 22. The first tab 60 is manipulated by moving the first tab 60 from the bent position toward the straight position.

The frame assembly 20 further includes a notch 80. The notch 80 is defined within the first end 28 of the first member 22 in either one of the appearance side 34 and the connecting side 36. The notch 80 engages the second member 24. More specifically, a projection 82 extends from the second tab 62 in a direction opposite to the second connector 58 and is disposed in the notch 80 in the first end 28 of the first member 22 when the first member 22 and the second member 24 are connected. The projection 82 in the notch 80 maintains the second tab 62 in a position to define a flush closed end of the transversely extending first member 22. The projection 82 may be further secured to the notch 80 by methods known in the art, such as, but not limited to, welding, use of adhesives, and the like.

Referring to FIG. 5, the second member 24 is shown in an unrolled form. FIG. 6 shows the first member 22 in an unrolled form. In one embodiment, both the first and the second member 22, 24 are formed from a sheet metal blank, which is preferably a rectangular piece of sheet metal. The sheet metal is cut to the desired shape of the either the first member 22 or the second member 24. The cutting may be done by hand or by a machine, such as a punch press. It is to be appreciated that other methods may be used to prepare the first member 22 and the second member 24 other than described. After the shape is cut, the first member 22 and the second member 24 are each rolled to form the desired shape. The first member 22 and the second member 24 are then completed by finishing the shapes such as by welding along the length of the members to establish the tubular structure. Any type of welding may be utilized to finish the members 22, 24 and other methods other than welding may also be used such as gluing as is known in the art. FIGS. 4A and 4B illustrate the completed first member 22 and the second member 24 after roll forming.

Obviously, many modifications and variations of the present invention are possible in light of the above teachings. The invention may be practiced otherwise than as specifically described within the scope of the appended claims.

What is claimed is:

1. A frame assembly for creating a flush corner appearance, said assembly comprising:
   a first member having a plurality of sides that extend between a first end and a second end and that define a first hollow area therebetween;
   a second member having a plurality of sides that extend between a first end and a second end;
   a connector extending from said first end of said second member;
   a tab extending from said connector for being disposed within said first hollow area for closing said first hollow area within said first end of said first member when said first member and said second member are disposed transversely to one another at said first ends, and
   wherein each of said sides of said first member are coplanar with each of said sides of said second member and said tab is flush with said first end of said first member and said first side of said second member to create the flush corner appearance between said first member and said second member.

2. An assembly as set forth in claim 1 wherein said connector is further defined as a first connector extending from a first side of said second member and a second connector extending from a second side of said second member such that said first side is opposite said second side.

3. An assembly as set forth in claim 2 wherein said tab is further defined as a first tab extending from said first connector and a second tab extending from said second connector.

4. An assembly as set forth in claim 3 wherein said first tab includes an inner face and is moveable about said first connector between a straight position and a bent position such that a channel is established between said inner face and said first end to guide said first member into engagement with said second member when said first tab is in said bent position.

5. An assembly as set forth in claim 1 wherein said tab includes an inner face and is moveable about said connector between a straight position and a bent position such that a channel is established between said inner face and said first end of said second member to guide said first member into engagement with said second member when said tab is in said bent position.

6. A frame assembly for creating a flush corner appearance, said assembly comprising:
   a first member having at least one appearance side and at least one connecting side that extend between a first end and a second end and that define a first hollow area therebetween;
   a second member having at least one appearance side and at least one connecting side that extend between a first end and a second end;
   said connecting side of said first member defining an opening extending thereinto from said first end to define a pair of lateral flanges;
   a first connector extending from said first end of said second member;
   a first tab connected to said first connector defining a first slot for disposing said members transversely to one another with said first end of said first member disposed over said first end of said second member with said flanges extending through said slot;
   said first tab having a cross-sectional area less than said first hollow area such that said first hollow area receives said first tab and said first tab being bendable about said first connector between a straight position and a bent position to guide said first member into engagement with said second member while in said bent position.

7. An assembly as set forth in claim 6 further comprising a second connector extending from said first end of said second member.

8. An assembly as set forth in claim 7 further comprising a second tab connected to said second connector to define a second slot for receiving said flanges into said second slot when said channel slideably receives said first member.

9. An assembly as set forth in claim 8 wherein said first connector extends from said connecting side and said second connector extends from another connecting side such that said first connector is opposite said second connector.

10. An assembly as set forth in claim 8 wherein said second tab fits snugly into said first hollow area for closing said first hollow area such that said first end of said first tubular member is closed and said first member and said second member are rigidly connected.

11. An assembly as set forth in claim 10 wherein said first member and said second member have equal cross-sections.

12. An assembly as set forth in claim 11 wherein said appearance side of said first member is coplanar with said appearance side of said second member when said first tab is received within said first hollow area.

13. An assembly as set forth in claim 10 wherein said second tab is flush with said first end of said first member.

14. An assembly as set forth in claim 6 wherein said first tab is tapered outwardly from said first connector.

15. An assembly as set forth in claim 6 wherein said first tab is tapered from about 1 degree to about 20 degrees.

16. An assembly as set forth in claim 8 further comprising a detent adjacent said flanges for retaining said first and second members engaged with one another.

17. An assembly as set forth in claim 16 wherein said detent extends from said flange for engaging said sides of said second member for retaining said first member and said second member engaged with one another.

18. An assembly as set forth in claim 16 wherein said detent extends from said flange for engaging said first tab for retaining said first member and said second member engaged with one another.

19. An assembly as set forth in claim 16 wherein said detent extends from said first tab for engaging said flange for retaining said first member and said second member engaged with one another.

20. An assembly as set forth in claim 19 wherein said flange has an aperture for receiving said detent for locking said first member and said second member to one another.

21. An assembly as set forth in claim 20 wherein said second member has a hole disposed in either one of said appearance side and said connecting side for disengaging said detent and unlocking said members.

22. An assembly as set forth in claim 8 wherein said first end of said first member includes a notch in either one of said appearance side and said connecting side for engaging said second member.

23. An assembly as set forth in claim 22 further comprising a projection extending from said second tab in a direction opposite said second connector, said projection being disposed in said notch in said first end of said first member for maintaining said second tab in a position to define a flush closed end of said transversely extending first tubular member.

24. An assembly as set forth in claim 8 wherein said second tab has a recess for engaging said first member.

25. An assembly as set forth in claim 8 wherein said first slot is further defined as a pair of first slots, each of said first slots being separated by said first connector.

26. An assembly as set forth in claim 25 wherein said second slot is further defined as a pair of second slots, each of said second slots being separated by said second connector.

27. An assembly as set forth in claim 26 wherein said flanges extend toward one another.

28. An assembly as set forth in claim 6 wherein said appearance side interconnects said connecting side.

29. An assembly as set forth in claim 28 wherein said first member and said second member are tubular.

30. An assembly as set forth in claim 29 wherein said first member and said second member have four sides as viewed in cross-section.

31. An assembly as set forth in claim 28 further comprising a pair of parallel appearance sides and a pair of parallel connecting sides.

32. An assembly as set forth in claim 6 wherein said first member and said second member are formed in a roll forming process.

33. An assembly as set forth in claim 6 wherein said first member and said second member are formed from a metal.

34. An assembly as set forth in claim 6 wherein said first member and said second member are formed from a plastic.

35. A frame assembly for creating a flush corner appearance, said assembly comprising:

a first tubular member having parallel appearance sides interconnected by parallel connecting sides as viewed in cross-section defining a first hollow area and extending between a first end and a second end;

a second tubular member having a pair of parallel appearance sides interconnected by a pair of parallel connecting sides as viewed in cross-section and extending between a first end and a second end;

said first tubular member and said second tubular member having equal cross-sections;

one of said connecting sides of said first tubular member having an opening extending thereinto from said first end thereof to define a pair of flanges extending toward one another and outwardly from said appearance sides thereof;

a first connector extending from said connecting side at said first end of said second member;

a first tab connected to said first connector having a width less than a distance between said flanges to define a pair of first slots for disposing said tubular members transversely to one another with said one end of said first tubular member disposed over said hollow first end of said second tubular member with said flanges extending through said slots and said appearance sides of said first tubular member coplanar with said appearance sides of said second tubular member;

said first tab having a cross-sectional area less than said first hollow area for receiving said first tab into said first hollow area;

a second connector extending from another connecting side at said first end of said second member;

a second tab connected to said second connector having a width less than said distance between said flanges to define a pair of second slots for disposing said flanges into said pair of second slots;

said second tab for fitting snugly into said first hollow area for closing same;

said first end of said first tubular member having a notch in said connecting side thereof opposite to said flanges;

a projection extending from said second tab in a direction opposite to said second connector for disposition in said notch in said first end of said first tubular member for maintaining said second tab in a position to define a flush closed end of said transversely extending first tubular member; and a detent adjacent said flanges for engaging said hollow second tubular member for retaining said first and second tubular members engaged with one another.

* * * * *